United States Patent
Keshet

(10) Patent No.: US 7,408,559 B2
(45) Date of Patent: Aug. 5, 2008

(54) UPSCALING OF ANTI-ALIASED GRAPHICAL ELEMENTS

(75) Inventor: Renato Keshet, Hod Hasharon (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/291,614

(22) Filed: Dec. 1, 2005

(65) Prior Publication Data

US 2007/0153022 A1   Jul. 5, 2007

(51) Int. Cl.
*G09G 5/00* (2006.01)
*G06K 9/40* (2006.01)

(52) U.S. Cl. .................... 345/611; 382/269

(58) Field of Classification Search ........... 345/472, 345/611, 629; 382/274, 299, 269
See application file for complete search history.

(56) References Cited

U.S. PATENT DOCUMENTS

| | | | | |
|---|---|---|---|---|
| 5,363,213 A | * | 11/1994 | Coward et al. | 382/299 |
| 5,673,376 A | * | 9/1997 | Ray et al. | 345/427 |
| 5,940,080 A | * | 8/1999 | Ruehle et al. | 345/611 |
| 6,501,483 B1 | * | 12/2002 | Wong et al. | 345/611 |
| 6,567,565 B1 | * | 5/2003 | Klassen | 382/274 |
| 6,828,983 B1 | * | 12/2004 | Vijayakumar et al. | 345/613 |
| 2001/0013873 A1 | * | 8/2001 | Wong et al. | 345/629 |
| 2002/0154123 A1 | * | 10/2002 | Harasimiuk | 345/472 |

* cited by examiner

*Primary Examiner*—Kee M. Tung
*Assistant Examiner*—Michelle K Lay

(57) ABSTRACT

Upscaling of an anti-aliased graphical element in a raster image includes generating a grid of pixels. Resolution of the grid is higher than resolution of the graphical element. Each pixel in the anti-aliased graphical element corresponds to a group of pixels in the higher resolution grid. The upscaling further includes distributing coverage of each transition pixel in the anti-aliased graphical element to the corresponding pixels in the higher resolution grid. The coverage is distributed unevenly.

20 Claims, 7 Drawing Sheets

UPSCALING OF ANTI-ALIASED GRAPHICAL ELEMENTS

BACKGROUND

Anti-aliasing is used to improve the appearance of graphical elements on computer screens. Without anti-aliasing, edges of graphical elements can appear jagged. Anti-aliasing can reduce the perceived jaggedness of the edges.

When an image is upscaled to a higher resolution, anti-aliased elements in the upscaled image can become blurred and artifacts can become visible. Consider an image of a road map that contains a number of anti-aliased graphical elements (e.g., streets, street names). While maps provided by leading Internet sites have sufficient resolution (72 ppi) to look fine on a computer screens, this resolution is not high enough for printing on standard printers, even with standard paper. Therefore, when viewed on a computer screen, edges of these anti-aliased elements appear sharp. When the elements are printed, however, edges in the print appear blurred. Many people mistakenly assume that their printers are of low quality, because their printers are "unable" to reproduce the visual quality perceived on the computer screens. In fact, the difference in perceived quality on the screen and quality of the print is due to the combination of the usually higher resolution power of the printer and paper media with the relatively low resolution of the map content.

It would be desirable to upscale anti-aliased graphical elements, while retaining perceived image quality.

SUMMARY

According to one aspect of the present invention, upscaling of an anti-aliased graphical element in a digital image includes generating a higher resolution grid of pixels, whereby each pixel in the anti-aliased graphical element corresponds to a group of pixels in the higher resolution grid; and distributing coverage of each transition pixel in the anti-aliased graphical element to the corresponding pixels in the higher resolution grid. The coverage is distributed unevenly.

Other aspects and advantages of the present invention will become apparent from the following detailed description, taken in conjunction with the accompanying drawings, illustrating by way of example the principles of the present invention.

DETAILED DESCRIPTION

Figure 1A:
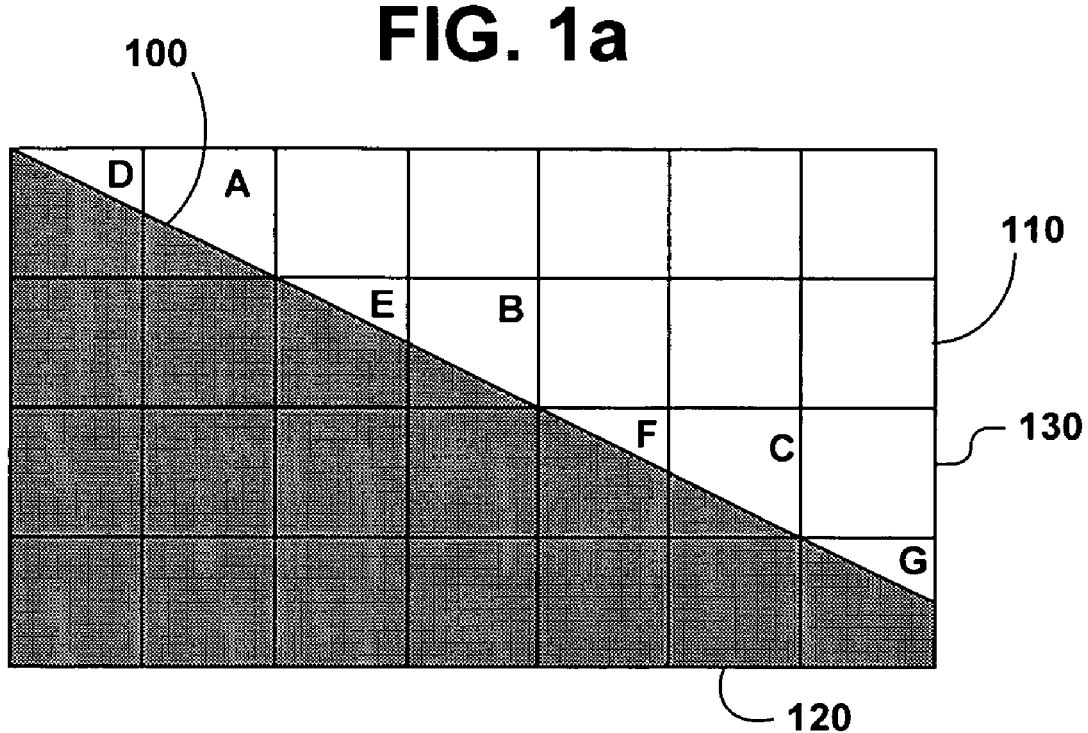
FIG. 1a is an illustration of a vector graphical element.

As shown in the drawings for the purpose of illustration, the present invention is embodied in a method of increasing the resolution of graphical elements in digital images. Examples of graphical elements include text, geometric shapes, and lines. The graphical elements may be generated by word processing programs, CAD programs, etc. Graphical elements are typically computer-generated, but could be formed in other ways.

In many graphical databases, the graphical elements are stored as vectors. A vector graphical element (also called a graphical element in vector format) is characterized by geometric information. For instance, a vector rectangle may be characterized by its corner coordinates. The vector rectangle may also describe foreground and background colors.

Reference is made to FIG. 1a, which illustrates an edge 100 of a vector graphical element. The edge 100 is superimposed on a pixel grid 110 of a certain resolution. Those pixels completely contained within the graphical element (dark area) are said to have 100% coverage, and are called foreground pixels 120. Those pixels completely excluded from the graphical element (white area) are said to have 0% coverage, and are called background pixels 130. Other pixels have partial coverage by the graphical element: pixels A, B, and C have 25% coverage, and pixels D, E, F and G have 75% coverage.

The coverage may be computed as the area of the graphical element inside the pixel region, divided by the total area of the pixel region. In mathematical terms, if A(X) is the area of a region X, P is the pixel region, and GE is the region occupied by the graphical element, then the coverage may be computed as $$Cov = 100 * A(P \cap GE)/A(P),$$

where Cov denotes the coverage in percentage.

Figure 1B:
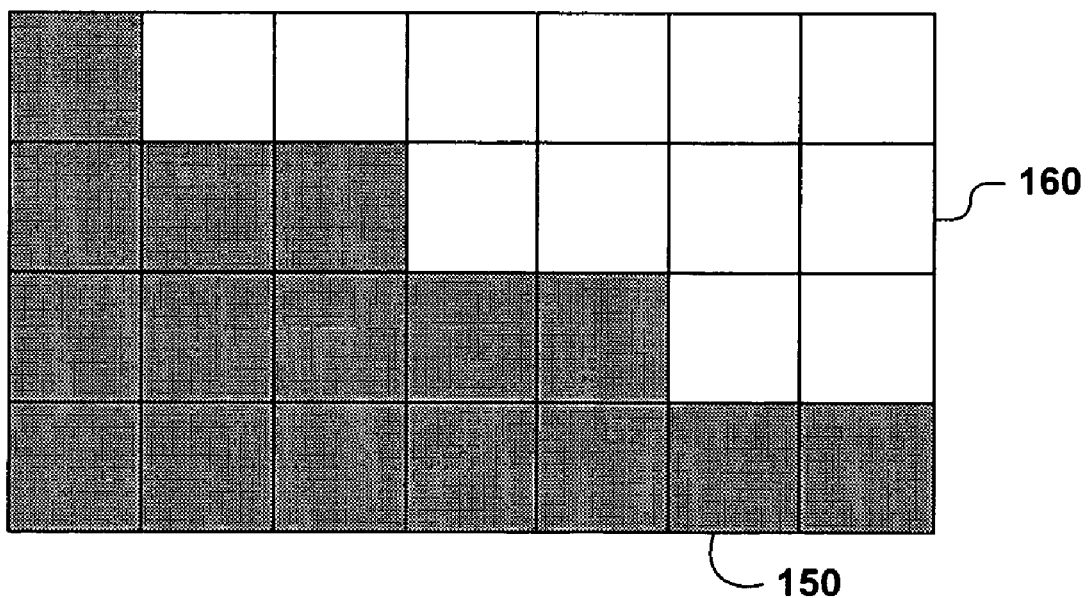
FIG. 1b is an illustration of a raster graphical element that is not anti-aliased.

Reference is made to FIG. 1b, which illustrates a raster image of the vector graphical element without anti-aliasing. Pixels in this non- anti-aliased graphical element may be formed by rounding each coverage to 0% or 100%, whatever is closest, and setting the corresponding color to the pixels. Thus, the non-anti-aliased graphical element has foreground pixels 150 set against background pixels 160. Without anti-aliasing, the edge appears jagged.

Figure 1C:
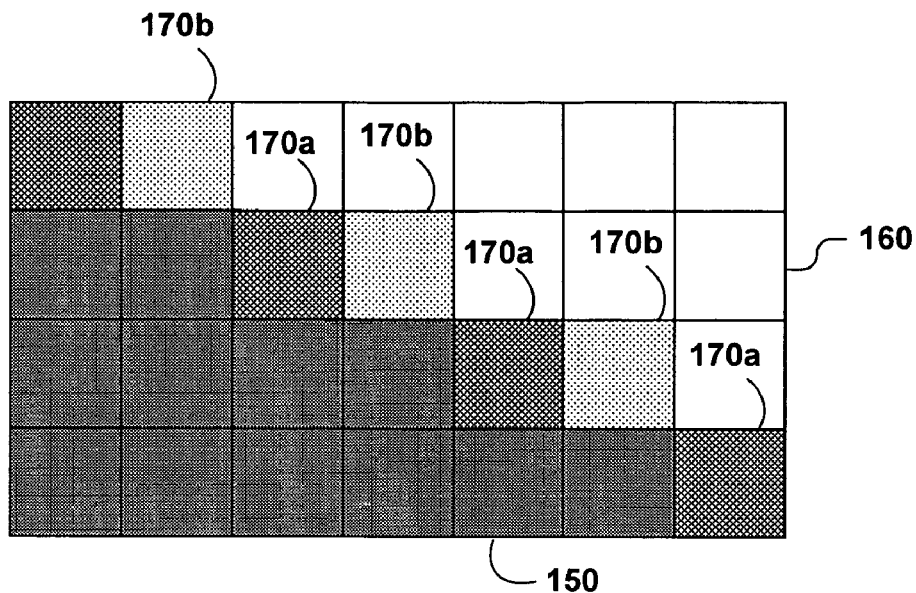
FIG. 1c is an illustration of a raster graphical element that is anti-aliased.

Reference is made to FIG. 1c, which illustrates a raster image of the vector graphical element with anti-aliasing. The anti-aliased element contains foreground pixels 150, background pixels 160 and "transition" pixels 170a and 170b. The colors represented by the transition pixels 170a and 170b may be somewhere between the foreground and background colors (e.g., different shades of gray). The actual color of a transition pixel 170a or 170b may depend on a specific anti-aliasing algorithm being used. In general, the intensity of the transition pixel represents the pixel coverage by the ideal graphical element. For example, the color (t) of a transition pixel 170a or 170b may be computed as a function of the coverage (Cov):

$$t = C_{bac} + (C_{for} - C_{bac}) * Cov/100.$$

where $C_{for}$ is the foreground color and $C_{bac}$ is background color.

In FIG. 1c, the transition pixels 170a and 170b have a darker shade than the background pixels 160. Some of the transition pixels 170a in FIG. 1c were created by lightening foreground pixels, while other transition pixels 170b were created by darkening background pixels.

Even though the examples in FIGS. 1a, 1b, and 1c, involve black and white colors only for the foreground and background, the foreground and background colors could be any pair of colors (i.e., any pair of points in a generic three-dimension or higher-dimension color space). For instance, the background color could be pink, and the foreground color brown. The foreground pixels could be lighter than the background pixels.

Figure 2:
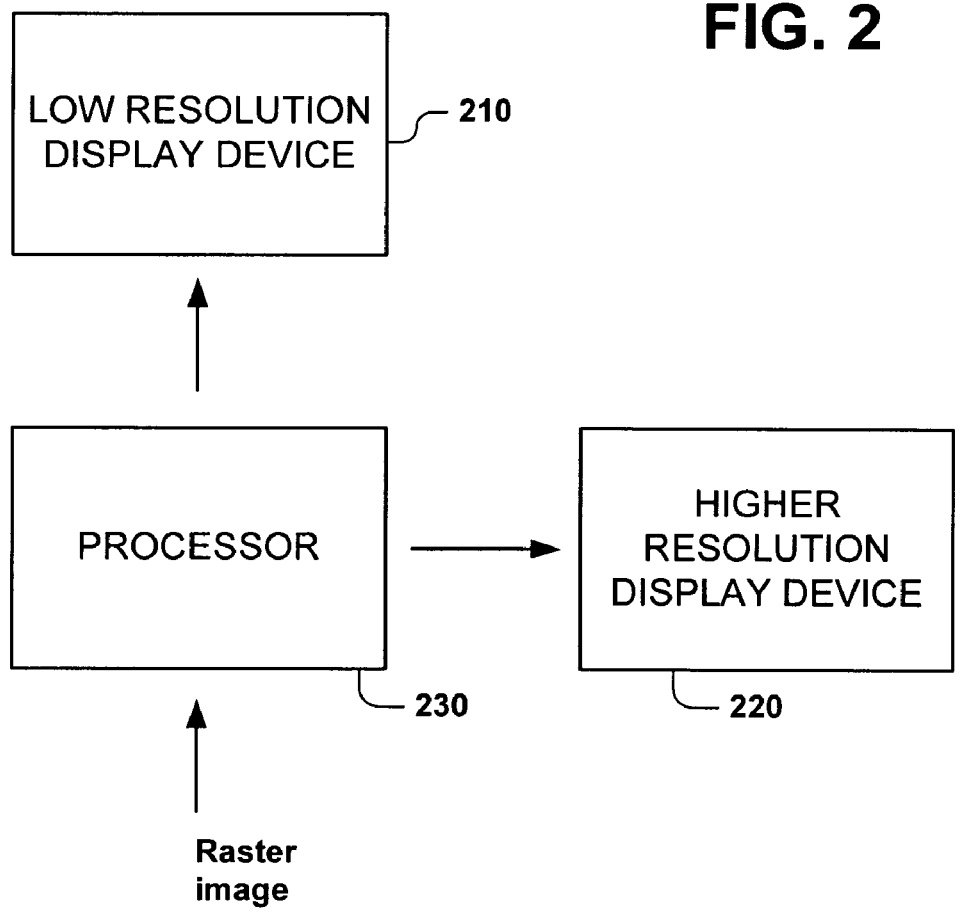
FIG. 2 is an illustration of a system according to an embodiment of the present invention.

Reference is made to FIG. 2. When the anti-aliased element is displayed on a low resolution display device (e.g., a video display) 210, the transition pixels create an illusion of smooth edges. However, when that same anti-aliased element is displayed on a higher resolution display device (e.g., a printer) 220, the edges may appear blurred. A processor 230 according to the present invention can process the anti-aliased element so its edges don't appear blurred on the higher resolution display device 220.

Figure 3A:
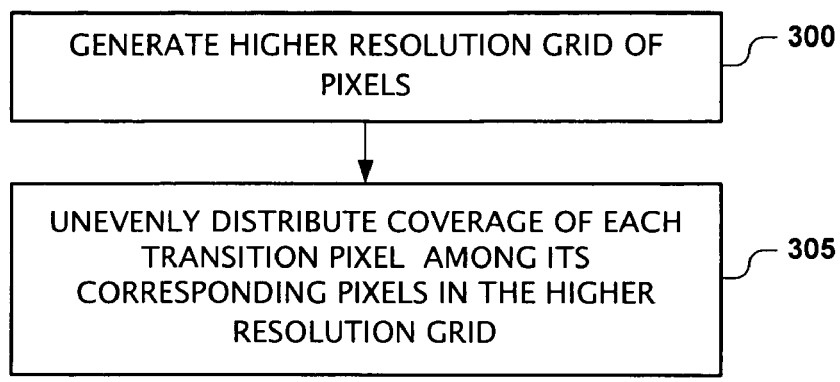
FIGS. 3a and 3b are illustrations of methods according to embodiments of the present invention.

Reference is made to FIG. 3a. Upscaling of an anti-aliased graphical element in a digital image includes generating a higher resolution grid of pixels (block 300). Each pixel in the anti-aliased graphical element corresponds to a group of pixels in the higher resolution grid. The upscaling further includes unevenly distributing coverage of each transition pixel in the anti-aliased graphical element to the corresponding pixels in the higher resolution grid (block 305).

Figure 3B:
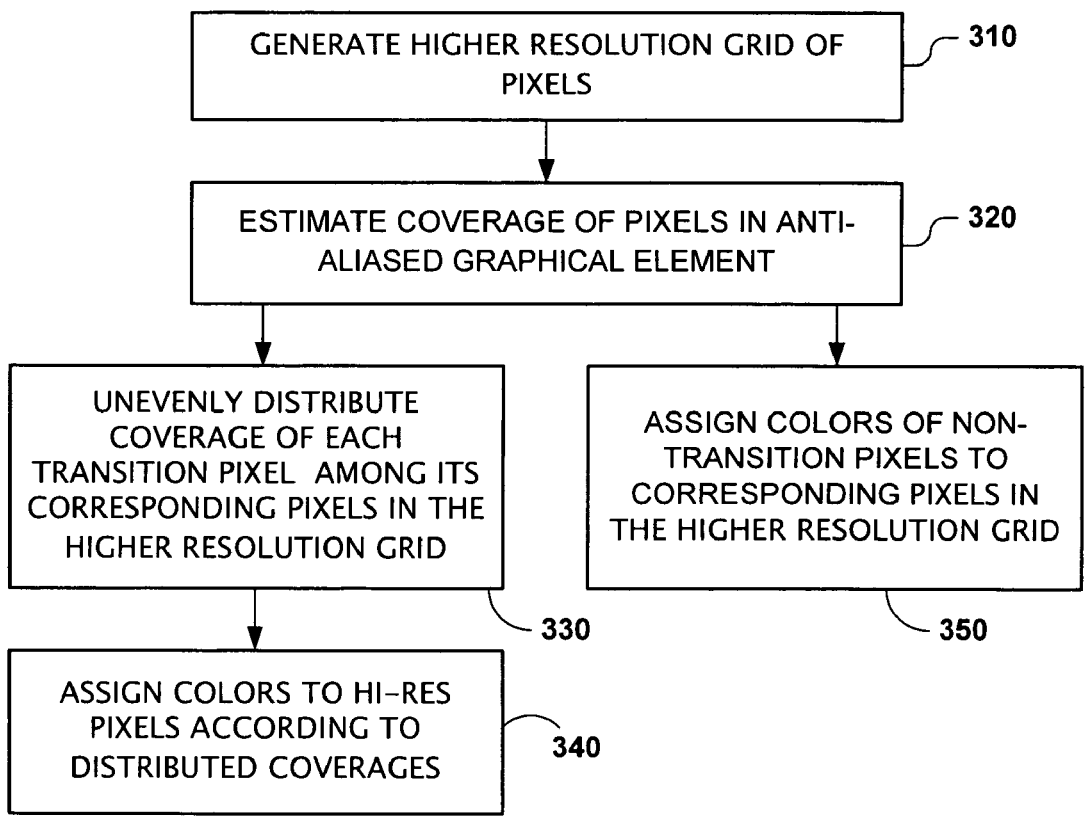

Reference is made to FIG. 3b, which illustrates a method used by the processor 230 to upscale an anti-aliased graphical element. Since the graphical element has been anti-aliased, it is represented as a raster image, not in vector form. Vector information (if any) about graphical element is assumed to be unavailable. Upscaling according to the present invention uses information in the raster image.

At block 310, a higher resolution grid of pixels is generated. Each pixel in the anti-aliased graphical element corresponds to a group of pixels in the higher resolution grid. For example, each pixel in the anti-aliased graphical element corresponds to a 2×2 block of pixels in the higher resolution grid. The pixels in the higher resolution grid will be referred to as "hi-res pixels." The pixels in the anti-aliased element will be referred to as "lo-res" pixels.

At block 320, the coverage of each pixel in the anti-aliased graphical element is estimated. Those lo-res pixels having partial coverage (i.e., coverages different from 0% and 100%) are identified as transition pixels.

At block 330, the coverage of each lo-res transition pixel is unevenly distributed among its corresponding hi-res pixels in the higher resolution grid. The uneven distribution will create the illusion of a smooth, sharp edge at the higher resolution when the higher resolution grid is displayed on the higher resolution display.

At block 340, colors are assigned to the hi-res pixels that correspond to the lo-res transition pixels. The colors are assigned as a function of the unevenly distributed coverage. Typically, but not necessarily, a hi-res pixel having a higher coverage will have a darker shade than a hi-res pixel having a lower coverage.

At block 350, the color of each non-transition pixel is assigned to its corresponding hi-res pixels in the higher resolution grid. Pixel replication could be performed on the foreground and background pixels. This step may be performed before, after, or with the steps at blocks 330 and 340.

FIG. 4 illustrates three pixels 150, 160 and 170a of an anti-aliased graphical element and corresponding pixels 450, 460 and $470a_1$-$470a_4$ that are upscaled by a factor of two. Each lo-res pixel of the anti-aliased graphical element corresponds to a 2×2 block of hi-res pixels in the higher resolution grid.

The lo-res pixel 150 having full coverage corresponds to a block of four full coverage hi-res pixels 450 in the higher resolution grid. The lo-res pixel 160 having zero coverage corresponds to a block of four hi-res pixels 460 having zero coverage.

For the transition pixel 170a of the anti-aliased graphical element, all hi-res pixels $470a_1$-$470a_4$ of the corresponding 2×2 block do not have the same color. The coverage is distributed such that the hi-res pixels $470a_3$ and $470a_4$ have higher coverages than the hi-res pixels $470a_1$ and $470a_2$ since hi-res pixels $470a_3$ and $470a_4$ are spatially closer to the full coverage pixels 450 and hi-res pixels $470a_1$ and $470a_2$ are spatially closer to zero coverage pixels 460. However, the average coverage of the hi-res pixels $470a_1$-$470a_4$ is roughly identical to the coverage of the corresponding transition lo-res pixel 170a.

Figure 5:
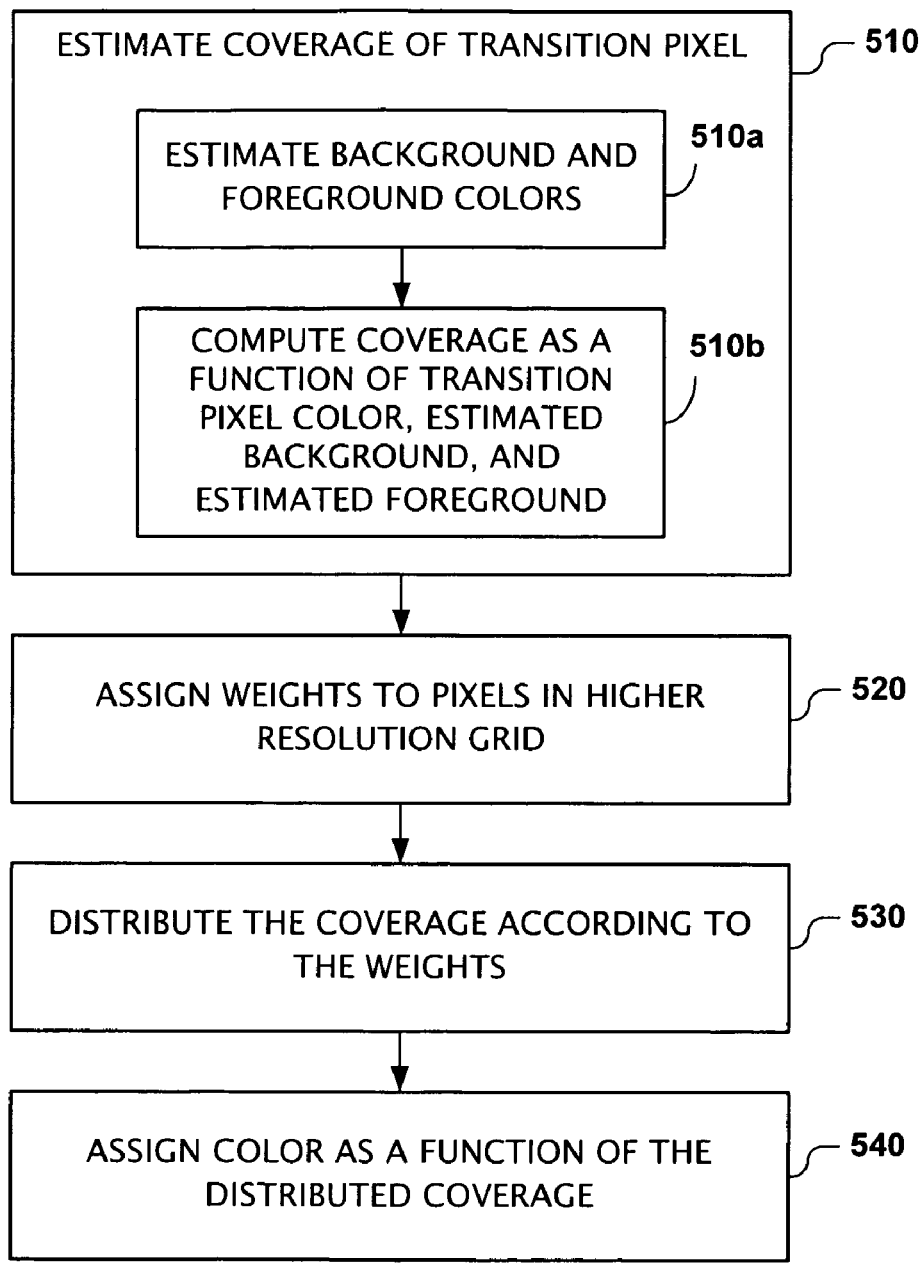
FIG. 5 is an illustration of a method of distributing transition pixel coverage according to an embodiment of the present invention.

Reference is now made to FIG. 5, which illustrates a method of unevenly distributing the coverage of a transition pixel. At block 510, coverage of the transition pixel is estimated. Background and foreground colors are estimated from a local neighborhood of lo-res pixels (block 510a). The local minimum (e.g., the darkest pixel) and the local maximum (e.g., the lightest pixel) within a 3×3 neighborhood of the transition pixel may be used as the estimated background and estimated foreground colors. Neighborhoods larger than 3×3 could be used instead. Alternatively, more complex methods for estimating the foreground and background colors could be employed (e.g., by searching for local minimum and maximum iteratively or within an adaptive neighborhood).

In certain instances, it might not be necessary to compute the local maximum and the local minimum in order to estimate the background and foreground colors. For instance, a set of possible foreground and background colors associated with a specific image type (such as road maps provided by a specific web site) may have been previously stored in memory. In this case, estimation of foreground and background colors may be performed by matching neighboring low-res pixels to this set of possible foreground and background colors.

The estimated coverage may be computed as a function of transition pixel color, an estimated foreground color, and an estimated background color (block 510b). For example, the estimated coverage ($cov_{est}$) of a transition pixel may be computed as $$cov_{est} = 100 * (t - C_{bac,est}) / (C_{for,est} - C_{bac,est})$$

where t is the color of the transition pixel, $C_{bac,est}$ is the estimated background color, and $C_{for,est}$ is the estimated foreground color.

At block 520, each hi-res pixel in the corresponding high resolution grid is assigned a weight. Pixels whose neighbors have higher coverage are assigned higher weights than hi-res pixels whose neighbors have lower coverage. The sum of the weights should be about equal to the number of hi-res pixels that correspond to one low-res pixel. In one embodiment, the hi-res pixels are assigned weights that are proportional to the average coverage of their neighboring pixels. Other policies for weight determination may be used.

Figure 4A:
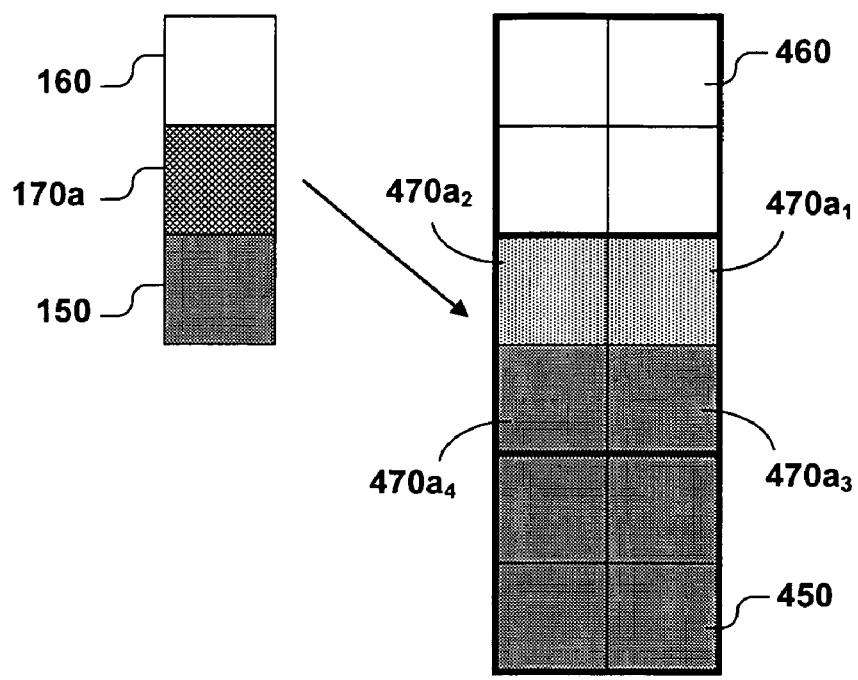
FIG. 4a is an illustration of pixels in an anti-aliased graphical element and their corresponding upscaled pixels.

Applying this step to the pixels in FIG. 4a, the sum of the weights should be equal to four. The transition pixel 170a has two adjacent neighbors: the North neighbor 160 has 0% coverage, and the South neighbor 150 has 100% coverage. Therefore, the hi-res pixels $470a_1$ and $470a_2$ that are adjacent to the North pixel 160 are assigned a weight of zero, and the two hi-res pixels $470a_3$ and $470a_4$ that are adjacent to the South pixel 150 are assigned a weight of two.

At block 530, the coverage is distributed to the hi-res pixels according to the weights. Higher coverage is assigned to hi-res pixels having higher weights. The coverages may be assigned by multiplying the weights by the coverage of the transition pixel. If a hi-res pixel is assigned a coverage greater than 100%, then the coverage of that pixel is set to 100%, and the remaining coverage is distributed between the remaining hi-res pixels according to the respective weights. The latter is repeated until all hi-res pixels have coverages lower or equal to 100%.

Applying this step to the pixels in FIG. 4a, the hi-res pixels $470a_1$ and $470a_2$ that are adjacent to the North pixel 160 get a coverage of 75%×0=0% each, whereas the two hi-res pixels $470a_3$ and $470a_4$ that are adjacent to the South pixel 150 get a coverage of 75%×2=150% each. Because these two pixels $470a_3$ and $470a_4$ are assigned a coverage greater than 100%, they are each set to 100% coverage, and the remaining 100% (i.e., 50%×2) are redistributed to the remaining hi-res pixels $470a_1$ and $470a_2$. Because these two pixels $470a_1$ and $470a_2$ have the same weight, the 100% balance is redistributed equally between them. Thus, each pixel $470a_1$ and $470a_2$ is assigned 50% coverage.

At block 540, colors are assigned to the hi-res pixels as a function of the redistributed coverage. For example, $$t = C_{bac,est} + (C_{for,est} - C_{bac,est}) * Cov_{est}/100$$

where t is pixel color, $C_{bac,est}$ is the estimated background color, and $C_{for,est}$ is the estimated foreground color.

Figure 4B:
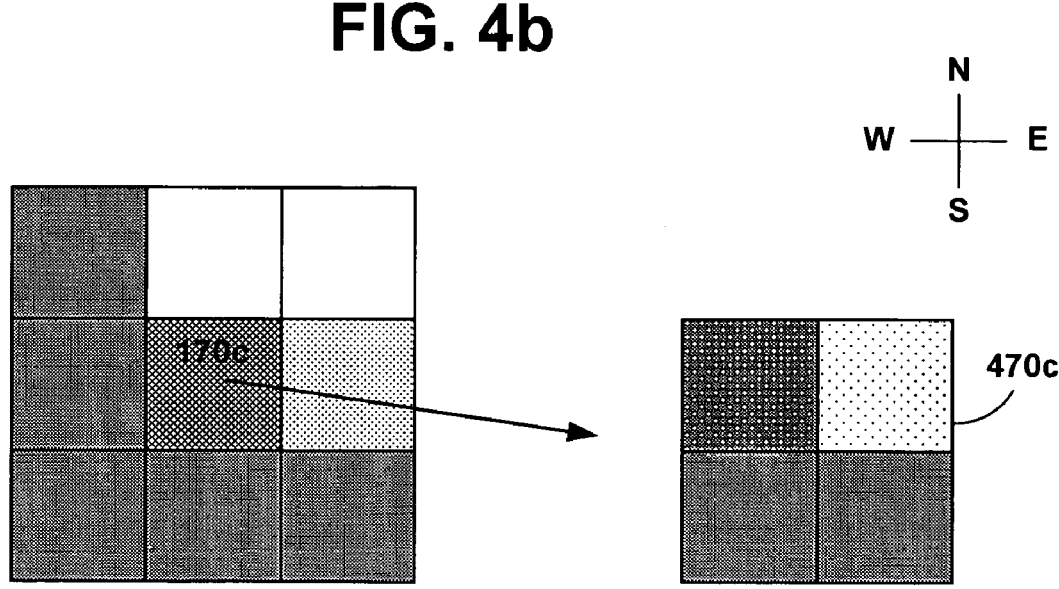
FIG. 4b is an illustration of pixels in an anti-aliased graphical element and their corresponding upscaled pixels.

FIG. 4b is another illustration of pixels in an anti-aliased graphical element and their corresponding upscaled pixels. Consider the central lo-res pixel 170c. After the steps at blocks 310 and 320 are applied, a 2×2 block 470c of hi-res pixels corresponds to the central lo-res pixel 170c, and the coverage of the central lo-res pixel 170c is estimated at 75%. In addition, the E low-res pixel is estimated to have a coverage of 25%, the NW, W, SW, S, and SE low-res pixels (relative to the central pixel 470c) all have 100% coverage, and N and NE low-res pixels have 0% coverage.

Weights can be assigned to the hi-res pixels of the block 470c by applying the method of FIG. 5. Consider the high-res NW pixel. It is spatially adjacent to the N, NW, and W low-res pixels (even though the high-res pixels are shown separately from the low-res pixels, they occupy the same spatial position as the central low-res pixel). The sum of the coverage percentage of the N, NW, and W low-res pixels is computed as 200%. Repeating this procedure for the NE, SW, and SE high-res pixels, the sums 25%, 300% and 225% are computed. After normalizing these sums to get a total weight of four, the weights 1.066666 . . . , 0.13333333 . . . , 1.6, and 1.2 are obtained for the NW, NE, SW, and SE hi-res pixels, respectively. By multiplying the coverage of the central low-res pixel (75%) by the above weights, the coverages 80%, 10%, 120%, and 90%, are obtained for the hi-res pixels in block 470c. The SW hi-res pixel has coverage higher than 100%; therefore, its coverage is set to 100% and the remaining 20% is distributed to the other pixels, according to their weights. The NW, NE, and SE hi-res pixels get additional 8.8888 . . . %, 1.11111 . . . %, and 10% coverages. Thus, the revised coverages of the NW, NE, SW, and SE hi-res pixels are now: 88.8888 . . . %, 11.1111 . . . %, 100%, and 100%. These coverages are not further revised, since they are all smaller than 100%. The average coverage of the block 470c is 75%, which is the same as the coverage of the lo-res pixel 170c.

Figure 6:
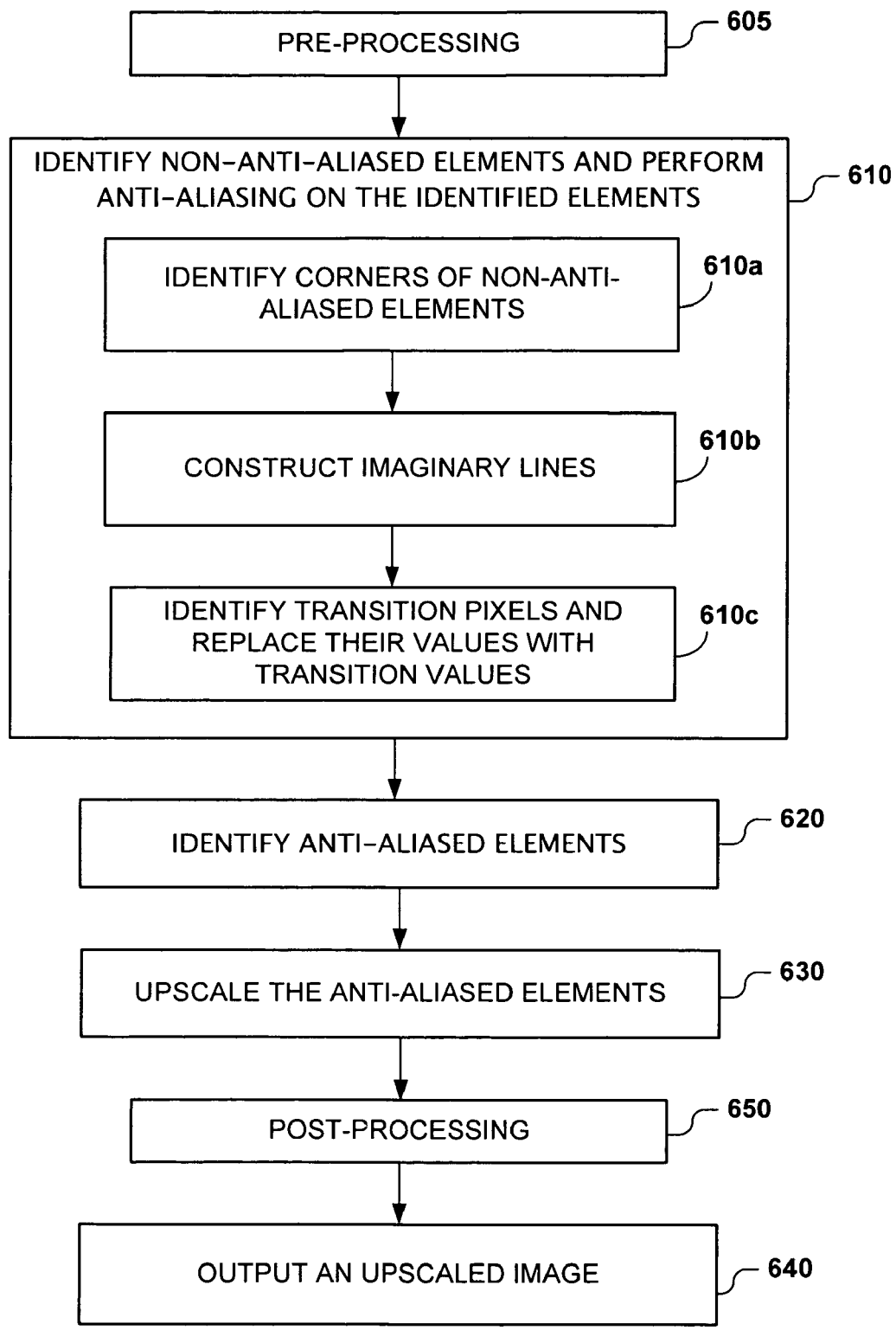
FIG. 6 is an illustration of a method of processing an image in accordance with an embodiment of the present invention.

Reference is made to FIG. 6, which illustrates a method of upscaling an input image that contains only graphical elements. Some or all of the graphical elements may be anti-aliased.

The processing is based on the following two assumptions:
a. Transition pixels are the only pixels with partial coverage and the partial coverage is due to anti-aliasing.
b. Foreground elements are darker than background elements.

However, other embodiments can be based on different assumptions.

At block 610, all non-anti-aliased elements are identified and converted to anti-aliased elements. This is done without the benefit of vector information. At block 610a, corners of the non-anti-aliased elements are identified. Local background and foreground colors are estimated. In one embodiment, this includes determining whether each pixel is a local maximum or a local minimum. In another embodiment, a set of possible foreground and background colors for a given image type is stored in memory, and pixels that match any of these colors are estimated as foreground or background colors. If the pixel is a foreground pixel, and a group of neighbors forming a corner are background pixels, then that pixel is marked as a corner pixel. There might be different types of corner pixels. The different types depend on the group of corner pixels used in the above determination. For instance, if the pixel is a foreground pixel and its North, West, and North-West neighbors are all background pixels, then the pixel may be identified as a North-West corner pixel. Or, if the pixel is a foreground pixel and its North, East and North-East neighbors are background pixels, then that pixel may be identified as a North-East corner pixel.

At block 610b, imaginary lines are constructed. If a second corner pixel of the same type and same color is detected in an adjacent line or column, and if the corner pixels are connected by adjacent pixels of the same color (as the corners), then an imaginary line is constructed from the first corner pixel to the second corner pixel. At block 610c, all pixels traversed by the imaginary line are marked as transition pixels, and their values are replaced by transition values.

Figure 7:
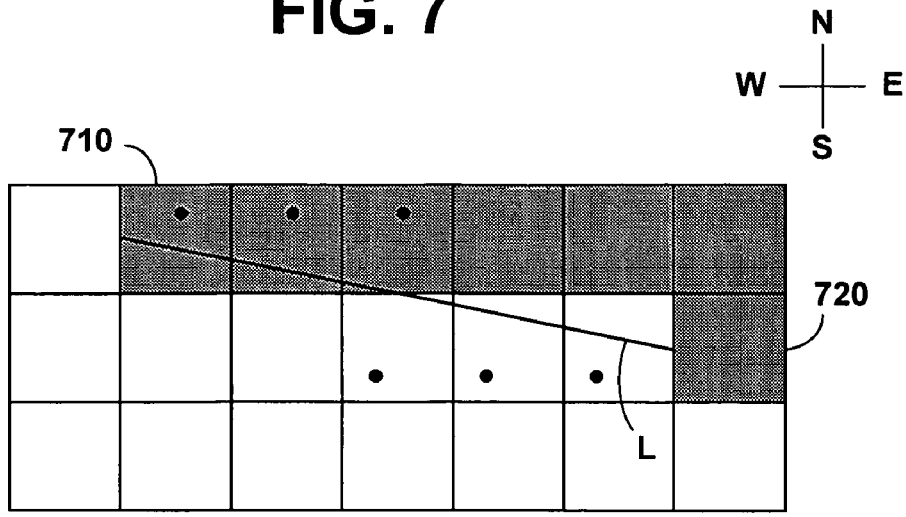
FIG. 7 is an illustration of a method of estimating transition values for pixels along an edge of a graphical element that is not anti-aliased.

Referring to FIG. 7, the transition values may be replaced as follows. FIG. 7 shows first and second South-West corners 710 and 720, connected by pixels of the same color, thus forming a non anti-aliased element. An imaginary line (L) extends between the two corner pixels 710 and 720, connecting the middle-point of the West side of corner pixel 710 to the middle-point of the West side of corner pixel 720. Those pixels crossed by the imaginary line (L) are identified as transition pixels. These pixels are marked with dots. Coverage of each transition pixel with respect to the line (L) is computed, background and foreground colors are estimated, and transition colors are assigned to these marked pixels according to the coverages.

FIG. 7 depicts one of eight possible configurations, which are listed below in Table 1. The eight configurations are distinguished by their corner pixels and their adjacency, namely, line or column adjacency. The procedure described with respect to block 610b is basically the same for all eight configurations, except for the selection of the side of the corner pixel, the middle-point of which should be crossed by the imaginary line (L). In the configuration of FIG. 7, the corner type is South-West, adjacency is line, and middle-point side is West.

TABLE 1

| Corner Type | Adjacency | Middle-Point Side |
| --- | --- | --- |
| SW | Line | West |
| SW | Column | South |
| SE | Line | East |
| SE | Column | South |
| NW | Line | West |
| NW | Column | North |
| NE | Line | East |
| NE | Column | North |

Reference is once again made to FIG. 6. At block 620, all anti-aliased elements are identified. At block 630, each anti-aliased element is upscaled according to the method of FIG. 3b.

At block 640, the upscaled image is outputted. For example, the upscaled image may be sent to an image rendering device, transmitted to another machine, stored in a storage device, etc.

Pre-processing and post-processing could be performed (blocks 605 and 650), depending upon whether the upscaling is part of a larger image processing pipeline. For example, image pipeline processing could include RIP, compression, transmission (pre-processing), layer-removal, sharpening, color modification, and decompression. If the upscaling is part of a stand-alone module, no pre-processing or post-processing would be performed. Instead, the upscaled image would be outputted right after upscaling.

The input image may contain more than one background color and more than one foreground color. However, the upscaling assumes that each local neighborhood has only one background color and one foreground color.

A method according to the present invention is not limited to performing anti-aliasing on non-anti-aliased elements and then upscaling all of the anti-aliased elements together. The non-anti-aliased elements could be upscaled separately from the anti-aliased elements.

Figure 8:
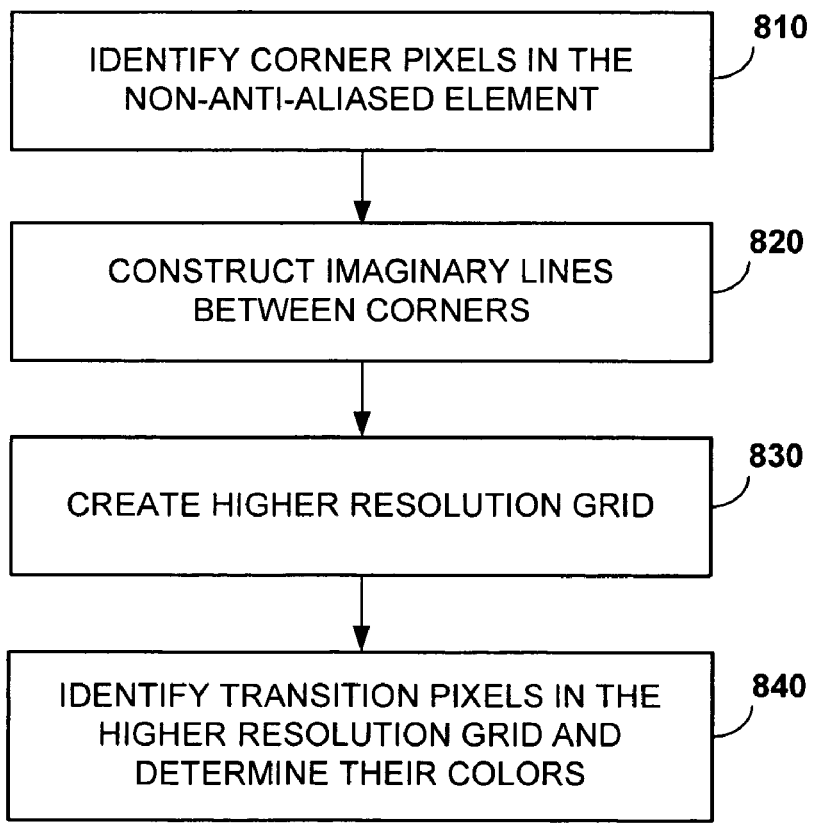
FIG. 8 is an illustration of a method of upscaling and anti-aliasing a non-anti-aliased element in accordance with an embodiment of the present invention.

Reference is now made to FIG. 8, which illustrates the upscaling and anti-aliasing of a non-anti-aliased element. At block 810, corner pixels of non anti-aliased element are identified. The approach of block 610b may be used At block 820, imaginary lines L are constructed between corner pixels. Here too, the approach of block 610b may be used.

At block 830, a high resolution grid is created. At block 840, transition pixel colors are assigned to corresponding hi-res pixels in the higher resolution grid. a higher resolution grid is generated. The imaginary lines L identify transition pixels and their coverages in the higher resolution grid. The colors of the transition pixels are determined, according to their coverages. The approach of block 610c may be used here, but on the higher resolution grid instead of a graphical element.

Reference is once again made to FIG. 2. A method according to the present invention is not limited to any particular hardware implementation. FIG. 2 illustrates a general hardware implementation.

In a specific hardware implementation, element 210 could be a video monitor, element 230 could be part of a personal computer, and element 220 could be part of a printer or other image rendering device. The method could be performed in a printer, in a printer driver, in a web-browser toolbar, or in a computer program.

For example, a personal computer runs a web browser that downloads a raster image of a map. The map contains anti-aliased elements. If displayed on the video monitor, edges of the map appear sharp.

Before the image of the map is printed, the image is upscaled to a higher resolution. A printer driver or browser toolbar may upscale the image according to the present invention. When the upscaled image is printed, the printed elements also appear sharp.

In other specific implementations, elements 220 and 230 could both be a part of an image-rendering device such as a printer or high definition television, or other machine that increases the resolution of a signal.

A system according to the present invention is not limited to the embodiments just described. The system could include a processor, but not the video display or image rendering device. Or, the system could include an image capture device (e.g., a scanner) that captures images and processes the captured images, where the processing includes upscaling graphical elements. The system could include memory to store a set of possible background and foreground colors, or any other known data.

Design of the processor 230 is application-specific. In some hardware implementations, the processor 230 could include a general-purpose processor and memory programmed with code that, when executed, causes the general purpose processor to perform a method according to the present invention. In other hardware implementations, the processor could be a specific purpose processor (e.g., a digital signal processor) that is programmed to perform a method according to the present invention.

Although specific embodiments of the present invention have been described and illustrated, the present invention is not limited to the specific forms or arrangements of parts so described and illustrated. The present invention is construed according to the following claims.

The invention claimed is:

1. A method of upscaling an anti-aliased graphical element in a digital image, the method comprising:
   generating a higher resolution grid of pixels, whereby each pixel in the anti-aliased graphical element corresponds to a group of pixels in the higher resolution grid; and
   distributing coverage of each transition pixel in the anti-aliased graphical element to the corresponding pixels in the higher resolution grid, wherein the coverage is distributed unevenly.

2. The method of claim 1, wherein the coverage of each transition pixel is about the same as the average coverage of the corresponding pixels in the higher resolution grid.

3. The method of claim 1, wherein the coverage of a transition pixel is estimated from transition pixel color, an estimated foreground color, and an estimated background color.

4. The method of claim 3, wherein the background and foreground colors are estimated from a local pixel neighborhood.

5. The method of claim 3, wherein the foreground and background colors are estimated by matching neighboring pixels to an a priori set of possible foreground and background colors.

6. The method of claim 1, wherein the coverage of each transition pixel is distributed according to neighboring pixel coverage in the graphical element.

7. The method of claim 1, wherein weights are assigned to pixels in the higher resolution grid; and wherein the coverage is distributed according to the weights.

8. The method of claim 7, wherein pixels whose immediate neighbors have higher coverage are assigned higher weights than pixels whose immediate neighbors have lower coverage.

9. The method of claim 1, further comprising assigning colors according to the distributed coverage.

10. The method of claim 1, further comprising identifying the transition pixels of the element as pixels with coverage between 0% and 100%.

11. The method of claim 1, wherein the coverage is redistributed to improve visual appearance.

12. A method of processing a raster image, the image including anti-aliased graphical elements, the method comprising upscaling the anti-aliased elements according to claim 1.

13. The method of claim 12, the image also including graphical elements that are not anti-aliased, the method further comprising performing anti-aliasing on the non-anti-aliased elements.

14. The method of claim 13, wherein the anti-aliasing includes identifying corner pixels, traversing between the corner pixels with a line, and determining coverage of traversed pixels with respect to the line.

15. The method of claim 12, the image also including graphical elements that are not anti-aliased, the method further comprising upscaling the non-anti-aliased elements.

16. The method of claim 15, wherein the upscaling includes identifying corner pixels, traversing between the corner pixels with a line, and determining coverage of hi-res pixels corresponding to the traversed pixels with respect to the line.

17. Apparatus for upscaling an anti-aliased graphical element in a digital image, the apparatus comprising:

means for generating a higher resolution grid of pixels, whereby each pixel in the anti-aliased graphical element corresponds to a group of pixels in the higher resolution grid; and means for distributing coverage of each transition pixel in the anti-aliased graphical element to the corresponding pixels in the higher resolution grid, wherein the coverage of each transition pixel is distributed unevenly.

18. Apparatus for upscaling a raster image including an anti-aliased graphical element, the apparatus comprising a processor for generating a higher resolution grid of pixels, whereby each pixel in the anti-aliased graphical element corresponds to a group of pixels in the higher resolution grid; and distributing coverage of each transition pixel in the anti-aliased graphical element to the corresponding pixels in the higher resolution grid, wherein the coverage of each transition pixel is distributed unevenly.

19. The apparatus of claim 18, wherein weights are assigned to pixels in the higher resolution grid; wherein pixels whose immediate neighbors have higher coverage are assigned higher weights than pixels whose immediate neighbors have lower coverage; and wherein the coverage is distributed according to the weights.

20. An article comprising memory encoded with code for causing a processor to upscale an anti-aliased graphical element in a digital image, including generating a grid of pixels, where resolution of the grid is higher than resolution of the graphical element, and where each pixel in the anti-aliased graphical element corresponds to a group of pixels in the higher resolution grid; and distributing coverage of each transition pixel in the anti-aliased graphical element to the corresponding pixels in the higher resolution grid, wherein the coverage is distributed unevenly.

* * * * *